US 8,122,439 B2

(12) United States Patent
Cascaval et al.

(10) Patent No.: US 8,122,439 B2
(45) Date of Patent: Feb. 21, 2012

(54) METHOD AND COMPUTER PROGRAM PRODUCT FOR DYNAMICALLY AND PRECISELY DISCOVERING DELIQUENT MEMORY OPERATIONS

(75) Inventors: Gheorghe C. Cascaval, Carmel, NY (US); Yaoqing C. Gao, North York (CA); Kamen Y. Yotov, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1230 days.

(21) Appl. No.: 11/836,449

(22) Filed: Aug. 9, 2007

(65) Prior Publication Data

US 2009/0044176 A1    Feb. 12, 2009

(51) Int. Cl.
   *G06F 9/44* (2006.01)
   *G06F 9/45* (2006.01)
(52) U.S. Cl. ......... 717/140; 717/128; 717/151; 717/162
(58) Field of Classification Search ........................ None
   See application file for complete search history.

(56) References Cited

U.S. PATENT DOCUMENTS

| | | | | |
|---|---|---|---|---|
| 5,805,863 | A * | 9/1998 | Chang | 717/158 |
| 6,002,875 | A * | 12/1999 | Stolberg | 717/153 |
| 6,275,981 | B1 * | 8/2001 | Buzbee et al. | 717/158 |
| 6,308,261 | B1 | 10/2001 | Morris et al. | |
| 6,351,845 | B1 * | 2/2002 | Hinker et al. | 717/128 |
| 6,381,739 | B1 * | 4/2002 | Breternitz, Jr. et al. | 714/37 |
| 6,883,067 | B2 * | 4/2005 | Southwell et al. | 711/118 |
| 7,401,330 | B2 * | 7/2008 | Li et al. | 717/162 |
| 7,707,564 | B2 * | 4/2010 | Marvin et al. | 717/140 |
| 7,730,469 | B1 * | 6/2010 | Boucher | 717/151 |
| 7,784,042 | B1 * | 8/2010 | Lobo et al. | 717/159 |
| 7,805,708 | B2 * | 9/2010 | Jeremiassen | 717/128 |
| 2005/0138294 | A1 | 6/2005 | Serrano et al. | |
| 2005/0138329 | A1 | 6/2005 | Subramoney et al. | |
| 2006/0112377 | A1 * | 5/2006 | Nacul et al. | 717/140 |
| 2006/0143421 | A1 | 6/2006 | Subramoney et al. | |
| 2007/0055961 | A1 * | 3/2007 | Callister et al. | 717/136 |
| 2007/0150881 | A1 * | 6/2007 | Khawand et al. | 717/162 |

(Continued)

OTHER PUBLICATIONS

Abi-antoun et al., Tool support for the compile-time execution structure of object-oriented programs with ownership annotations, Nov. 2007, pp. 543-544, <http://delivery.acm.org/10.1145/1330000/1321735/p543-abi-antoun.pdf>.*

(Continued)

*Primary Examiner* — Thuy Dao
(74) *Attorney, Agent, or Firm* — Cantor Colburn LLP; Libby Toub

(57) ABSTRACT

A method and computer product for dynamically and precisely discovering delinquent memory operations through integration of compilers, performance monitoring tools, and analysis tools are provided. The method includes compiling an application, and linking the application with a tracing library to generate executable, compiler annotated information and linker mapping information. The application is executed to obtain runtime trace information that includes hardware performance counters and tracing library instrumentation events. The trace information, the compiler annotated information, and the linker mapping information are analyzed to produce a delinquent memory operation file containing delinquent memory operation information. The delinquent memory operation information of the delinquent memory operation file is read by the compiler to perform memory reference mapping to guide static analysis and memory hierarchy optimization. The memory reference mapping maps delinquent memory operations precisely, both externally in a user source code and internally in a compiler intermediate representation.

4 Claims, 2 Drawing Sheets

U.S. PATENT DOCUMENTS

| | | | |
|---|---|---|---|
| 2007/0174828 A1* | 7/2007 | O'Brien et al. | 717/151 |
| 2007/0245325 A1* | 10/2007 | Lapounov et al. | 717/140 |
| 2009/0044176 A1* | 2/2009 | Cascaval et al. | 717/128 |
| 2009/0106744 A1* | 4/2009 | Li et al. | 717/151 |

OTHER PUBLICATIONS

Lau et al., Selecting Software Phase Markers with Code Structure Analysis, Mar. 2006, pp. 1-12, <http://delivery.acm.org/10.1145/1130000/1122399/24990135.pdf>.*

Chen et al., Verifiable annotations for embedded java environments, Sep. 2005, pp. 105-114, <http://delivery.acm.org/10.1145/1090000/1086312/p105-chen.pdf>.*

Wulf et al., "Hitting the Memory Wall: Implications of the Obvious", Department of Computer Science, Dec. 1994.

Horowitz, et al., "Information Memory Operations: Memory Performance Feedback Mechanism and Their Applications" ACM Transactions on Computer Systems, vol. 16, No. 2, pp. 170-205, May 1998.

Callahan et al., "Data Cache Performance of Supercomputer Applications" IEEE, May 1, 1990.

Sweeney et al., "Using Hardware Performance Monitors to Understand the behavior of Java Applications", IBM Thomas J. Watson research Center, 2003.

Kim et al., "Physical Experimentation with Prefetching Helper Threads on Intel's Hyper-Threaded Processors", IEEE, Sep. 2004.

Panait et al., "Static Identification of Delinquent Loads", IEEE, Sep. 2004.

Wang et al., "Helper Threads via Virtual Multithreading on an Experimental Itanium 2 Processor-based Platform" ASPLOS 2004, Oct. 2004.

Bacon et al., "Braids and Fibers: Language Constructs with Architectural Support for Adaptive Responses to Memory Latencies".

* cited by examiner

METHOD AND COMPUTER PROGRAM PRODUCT FOR DYNAMICALLY AND PRECISELY DISCOVERING DELIQUENT MEMORY OPERATIONS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

This invention relates to avoiding cache misses in performance critical paths, and particularly to identifying instructions that can be classified as delinquent memory operations.

The effective use of processor caches is crucial to the performance of applications. Currently, compiler optimizations have increasingly focused on the memory hierarchy, and a variety of efforts have attempted to reduce cache misses. Experiments show that a very small number of memory referencing instructions cause the vast majority of cache misses which degrade the performance dramatically. We call these instructions delinquent memory operations.

It would be desirable to have methods and computer program products to identify delinquent memory operation instructions for effective cache optimizations, such as data prefetching and data reorganization.

SUMMARY

In accordance with an exemplary embodiment, a method for dynamically and precisely discovering delinquent memory operations through integration of compilers, performance monitoring tools, and analysis tools is provided. The method includes compiling an application, and linking the application with a tracing library to generate executable, compiler annotated information and linker mapping information. Further, the application is executed to obtain runtime trace information that includes hardware performance counters and tracing library instrumentation events. Also, the trace information, the compiler annotated information, and the linker mapping information are analyzed to produce a delinquent memory operation file containing delinquent memory operation information. Additionally, the delinquent memory operation information of the delinquent memory operation file is read by the compiler to perform memory reference mapping to guide static analysis and memory hierarchy optimization. The memory reference mapping maps delinquent memory operations precisely, both externally in a user source code and internally in a compiler intermediate representation.

In accordance with the exemplary embodiment, a computer program product, tangibly embodied on a computer readable medium, is also provided for dynamically and precisely discovering delinquent memory operations through integration of compilers and performance tools. The computer program product includes instructions for causing a computer to execute the above method.

Additional features and advantages are realized through the techniques of the present invention. Other embodiments and aspects of the invention are described in detail herein and are, considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE EXEMPLARY EMBODIMENT

The present disclosure describes a method to dynamically discover delinquent memory operations precisely through a set of tools that include compiler support, profiling using sampled hardware counters, and analysis tools.

Currently, delinquent memory operation identification is done either through static analysis or dynamic profiling. Delinquent memory operations can be identified at compile-time using memory access patterns and cache behavior analysis. Static delinquent memory operation identification usually lacks accuracy due to unknown runtime cache behavior information. Dynamic profiling can be done through compiler instrumentation, binary instrumentation tools, or simulation modeling. For the dynamic profiling approach through compiler or binary instrumentation, the compiler or binary instrumentation tool inserts instructions in an application directly or invokes application programming interfaces (API) provided by library packages to read hardware performance counter data, records the cache statistics internally, and records delinquent memory operation information. This approach might change the cache behavior due to internal data structure accesses. Profiling can also be done through trace-driven simulation-based monitoring. Simulation-based monitoring is usually very costly for large-scale applications due to the high overhead and potential inaccuracy from the simulators.

Figure 1:
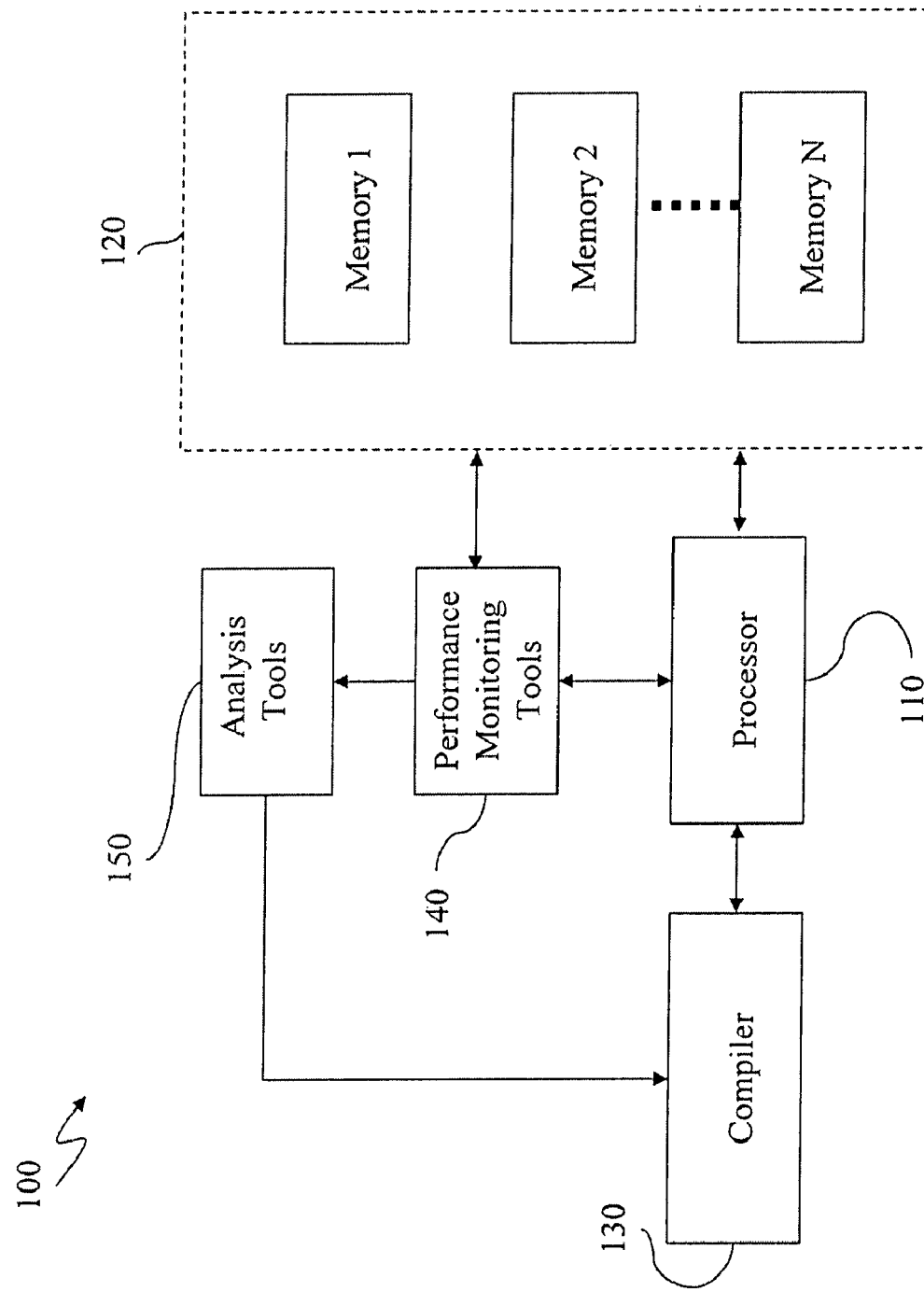
FIG. 1 is a block diagram of an exemplary device utilizing a process to dynamically and precisely discover delinquent memory operations in accordance with an exemplary embodiment.

FIG. 1 is a block diagram of an exemplary device utilizing a process to dynamically and precisely discover delinquent memory operations in accordance with an exemplary embodiment. The process may be implemented on a device 100 (e.g., a general purpose computer, server, etc.), which includes a processor 110 executing computer program code stored on a storage medium [not shown] in order to perform the processes described herein. It is understood that other processor-based devices (e.g., personal digital assistants, laptops, gaming devices) may implement the exemplary processes described herein. Thus, the exemplary embodiment is not limited to personal computers. The device 100 includes memory 120, which represents various types of memories including multiple caches at different levels.

The exemplary embodiment provides a method, which may be implemented in the device 100, to dynamically and precisely discover delinquent memory operations through the integration of compilers 130, performance monitoring tools 140, and analysis tools 150 to boost application performance by avoiding cache misses in performance-critical paths.

The compiler 130 generates annotated information about instruction groups, what optimizations such as inlining and unrolling are performed, what symbol mappings are conducted, etc. This information is used by both the analysis tools 150 at a delinquent memory operation analysis stage and the compiler 130 at a re-compilation stage A predefined instrumentation library is provided as part of the performance monitoring tools 140 to trace the memory regions of the memory 120 that are accessed by each memory reference at runtime. This allows the analysis tools 150 to generate the information on accessed memory regions, address range, access density, etc.

Sampling-based dynamic profiling is used as part of the performance monitoring tools 140 to discover the delinquent memory operations, e.g., which cache level the cache misses occurred in, and what is the cache miss frequency. A set of the analysis tools 150 are used to analyze the information from the low-level trace output, linker output, run-time log output, and compiler report output. Two approaches are utilized to deal with the inaccuracy of the instruction address trace, which may be an inherent problem in most superscalar processors due to the mode in which groups of instructions are tracked together in the processor pipeline. The first approach uses compiler static analysis to further identify which instructions are actually delinquent when there are multiple loads in an instruction group. In this exemplary case, the compiler does not need further dynamic information and can use the information directly for optimization. In the second approach, the compiler 130 generates instructions that force the processor 110 to separate memory reference instructions into distinct groups.

With the integrated compiler 130, performance monitoring tools 140, and analysis tools 150, the analysis tools 150 can identify delinquent memory operations at low instruction levels, and the compiler 130 maps delinquent memory operations precisely in the intermediate representation level, which in turn identify memory references at the user source level. The compiler 130 maintains the information about what transformations are done and keeps line information consistent through different optimization phases and internal symbol mapping.

As non-limiting examples, the exemplary embodiment may be implemented in an IBM® PowerPC architecture. This is based on the availability of the hardware performance monitor unit provided by IBM® PowerPC architecture, which makes it possible to count instruction and data cache misses serviced at the different levels of the memory hierarchy, as well as sample the addresses for these misses with a certain frequency.

As mentioned herein, the process of the exemplary embodiment provides a method to dynamically discover delinquent memory operations precisely through the integration of the compiler(s) 130, performance monitoring tools 140, and analysis tools 150 to boost application performance by avoiding cache misses in performance-critical paths. Existing techniques lack the interaction between the compiler (s) 130 and performance 140 and analysis 150 tools.

Moreover, it has traditionally been difficult to generate the address traces and memory hierarchy miss rate information precisely, especially on modern super-scalar architectures with deep pipelining and out of order execution. On typical modern processors, instructions are grouped (or cracked) and tracked as a group throughout the execution pipeline. Thus, several memory instructions may end up in the same group, and the hardware performance monitoring unit cannot precisely detect which is the cache missing instruction. The exemplary embodiment, however, uses the compiler 130 to refine instruction groups without changing runtime cache behavior, and thus facilitate the discovery of particular delinquent memory operation instructions more precisely.

After a delinquent memory operation instruction is identified at the instruction level, it is very difficult, sometimes impossible, to map it at the user's source level without the help of the compiler 130. Especially when aggressive optimizations are applied, the compiler 130 is used to reconstruct the mapping to user source level (code). In the exemplary embodiment, the compiler 130 generates an annotated listing (i.e., compiler annotated information) that contains additional information on the location of memory referencing instructions. The annotated listing is used by the delinquent memory operation analysis tool (e.g., the performance tools 140 and/or the analysis tools 150) and the compiler 130. The delinquent memory operation analysis tool (e.g., the performance tools 140) discovers delinquent memory operations at the instruction level (by using the annotated listing). The compiler 130 reads the delinquent memory operation information discovered by the delinquent analysis tool and performs precise memory reference mapping both at internal intermediate representation level and at user source level with the combination of dynamic profiling information and static analysis.

Figure 2:
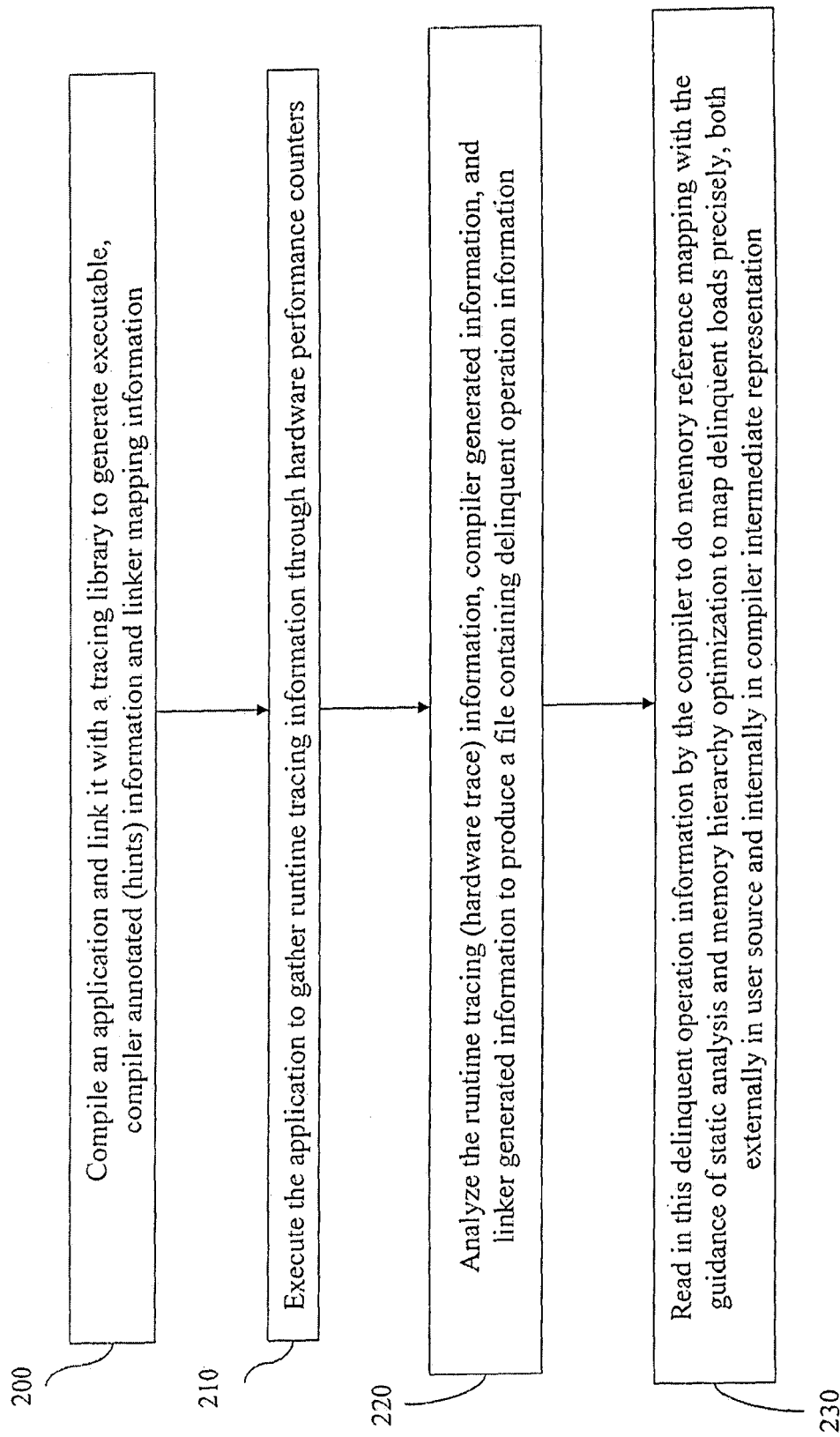
FIG. 2 illustrates a method for dynamically and precisely discovering delinquent memory operations in accordance with the exemplary embodiment.

FIG. 2 is a flow chart of a method for dynamically and precisely discovering delinquent memory operations through integration of compilers and performance tools in accordance with the exemplary embodiment.

The process compiles an application and links the application with a tracing library to generate executable, compiler annotated (hints) information and linker mapping information at 200. The application is executed to gather runtime tracing information through hardware performance counts at 210. The runtime tracing (hardware trace) information, the compiler generated annotated (hints) information, and the linker generated (mapping) information (along with sampling information) are analyzed to produce a file containing delinquent memory operation information at 220. The fire containing delinquent memory operation information may comprise the file name, function name, line number, delinquent memory operation name, memory region identifier, memory region start address, memory region size, etc. At 230, the delinquent memory operation information is read in by the compiler to perform memory reference mapping with the guidance of static analysis and memory hierarchy optimization to map delinquent memory operations precisely, both externally in the user source and internally in the compiler intermediate representation (e.g., a compiler internal form to represent delinquent memory operation information).

An attached Appendix, herein incorporated by reference, provides non-limiting examples of functions used in dynamically and precisely discovering delinquent memory operations through integration of compilers 130 and performance tools 140. Also, the Appendix provides non-limiting examples of the performance tools 140 interacting with the compiler 130 in accordance with the exemplary embodiment including instructions for code that may be used or a computer program product. In the Appendix, the tools 1.1, 1.2, 1.3, and 1.4 discussed herein may be considered part of the performance tools 140.

The detailed examples of the exemplary embodiment described above are for explanatory purposes only and are not meant to be limiting in any way.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While the exemplary embodiment to the invention has been described, it will be understood that those skilled in the art, both now and in the future, may make various improvements and enhancements which fall within the scope of the claims which follow. These claims should be construed to maintain the proper protection for the invention first described.

APPENDIX 1.1 Interfaces Between the Compiler and Performance Tools
Instruction group information:
  a. InstructionAddress: the address sampled in the trace file. It can serve as an ID of the group of lines that follows. Due to the precision of the profiling tools, the InstructionAddress is considered a pointer to a dispatch group rather than a pointer to an instruction.
  b. MissPersentage: how often the address above appears in the trace (# occurrences/length_of_trace).
  c. FunctionName: the function the dispatch group belongs to
  d. GroupID: the dispatch group ID from the extended compiler listing.
  e. NumberOfMemmoryOperations: the number of memory access instructions in the dispatch group above. Any of the memory access instructions in the dispatch group could have caused the miss. This is also the number of instructions described in subsequent lines.
  f. NumberOfAccessedRegions: the number of memory regions accessed by the instructions above.
  g. NumberOfAccessedRegionsListed: the number of regions which are described in subsequent lines.
Delinquent memory operation information:
  a. CacheLevel: delinquent memory operation information; Level could be 1, 2, 3 for L1 miss, L2 miss and L3 miss, respectively.
  b. FunctionName: function name where delinquent memory operations appear.
  c. FileName: file name.
  d. OriginalFunctionName: original function name where delinquent memory operations come from.
  e. LineNumber: line number.
  f. DelinquentLoadName: delinquent memory operation name.
  g. DelinquentLoadNumber: the sequence number of the delinquent memory operation.
  h. MissPercentage: overall cache miss percentage.
  i. MemoryRegionName: memory region name.
  j. MemoryRegionStartAddress: start address of the memory region (0 means unknown).
  k. NumberOfRegions: number of regions (>=1).
  l. MemoryRegionSize: average memory region size (0 means unknown).

1.2 Gather Dynamical Trace Information

To gather dynamical trace information: (1) Compile the application with specified options "-qlist -qsource -qreport -qxflag=CPO1" to generate the compiler annotated listing. (2) Link with the instrumentation library so that memory region can be recorded at runtime; (3) Generate the link map files; and (4) Pass the required parameters to the tool and run application to gather the trace information.

The wrapper functions are implemented in a dynamically linked library (wrap_mm.so). The dynamically linked library records the address of the calling instruction which invokes the corresponding standard library memory management function, and records a log entry with the gathered information. These log entries should be synchronized with the corresponding memory access instructions from the trace. Synchronization is performed by using the AIX (e.g., IBM® UNIX Operating System) trace API to inject the memory management log entries directly into the trace of sampled cache misses. This creates a relative ordering which significantly simplifies the instruction to memory region mapping.

The required parameters for the 1.2 tool are the following: frequency (sampling frequency); group and counter (performance counting group and counter within the group); cpu (the largest processor number, i.e., the number of processors available in the system—1); tracerawfile (this is the name of the raw trace file generated by eprof.); tracetextfile (trace text file name); maxbufsize (this is the memory buffer size used for sampling.); and maxfilesize (this is the maximum size of the trace on disk).

As a result of executing the tool 1.2, the trace text file (trace.txt) is generated. As non-limiting examples, the Trace.txt has lines in the following format:
010 0.017933002 0.000696 type: 0000000000000001|caller: 0000000100000A94|address: 000000011004F330|size: 0000000000000280 Case (1)

Also, as non-limiting examples, the Trace.txt has lines in the following format:
238 56.738877431 3.261504 iaddress: 0000000100005400|daddress: 00000001101FFFD8 Case (2)

In the first case, the columns include the time memory management function was called, the type of function (e.g., malloc, free, etc.), the instruction address of the call (or rather of the instruction following the call), the data address of the allocated block, and die size of the allocated block.

In the second case, the concern is with the iaddress/daddress pair. These are hex addresses of a particular sampled instruction, and the data address accessed that these hex addresses caused the miss.

1.3 Analyze Delinquent Memory Operation Information

After compiling the program (application) and executing the program with the tool in 1.2, the following files are available for analysis to generate a file containing delinquent memory operation information: 1) the original source files; 2) whole program listing with annotations generated by the compiler; 3) the map file generated by linker; and 4) the hardware trace File intermixed with memory management calls.

The analysis tool 1.3 works as follows:
(1) Read the map file and create a mapping from symbol name to starting address.
(2) Read the program listing.
  a. Build a file id to name mapping table
  b. Build a mapping from function name to list of lines c. Build a list of function names called "routines"
d. For each function <name> in routines:
  i. Set routine_binary_offset[<name>] as the offset from the first line in the listing of that function
  ii. Set routine_binary_size[<name>] as the binary size of the routine, calculating it from the difference of the offsets of the last and first lines in the listing of that function
  iii. Save the function listing in routine_binary[<name>]
  iv. Save the function entry point in routine_entry_point [<name>]
(3) Read the trace file.
a. Memory allocation records are parsed to keep a running set of live regions along with the actual line in the listing of the call to malloc/free, based on the logged caller instruction address. From that line in the listing, find the line in the original source file (and the name of the source file itself). Parse die line of the source to get the name of the array being allocated. The following fields are preserved:
  i. 0-based region id
  ii. function name which malloced the region
  iii. file name of the line containing the call to malloc
  iv. line number for that line
  v. name of the array
  vi. starting data address returned by malloc
  vii. size of the malloced region
b. Cache miss records such as tuples, SIAR, and SDAR are processed as follows.
c. Build a set "iaddrs" of all different instruction addresses in the trace.
d. For each instruction address in iaddrs, find all corresponding data addresses in the trace and build the mapping iaddr_daddrs[<iaddr>].
e. For each instruction address in iaddrs, assign a frequency fraction, equal to the number of data addresses for that instruction divided by the total size of the trace. This is the portion of the misses that are caused by this single static instruction.
f. Sort the instructions by decreasing frequency, and cutoff after accounting for a particular fraction of all misses. Name the sorted sequence "lliaddrs".
(4) Analyze Delinquent Memory Operations.
For each entry in lliaddrs:
i. Find the instruction at the particular address in the listing.
ii. Find the dispatch group of this instruction based on the listing.
iii. Collect all instructions from that dispatch group that might access memory.
iv. For each such instruction, collect function name, file name, line number, and accessed variable name.
v. Frequency is currently evenly distributed among the instruction of a single dispatch group, and this can be relined.
vi. The requested information is printed out.

Below depicts a non-limiting example of the delinquent memory operation information in an instruction group generated by the analysis tool 1.3:

```
GROUP BEGIN
GROUP ADDRESS 0x0000000100008620
GROUP FREQUENCY 0.03448
GROUP FUNCTION collision
GROUP OFFSET 0x0000000000005384
```

-continued

```
GROUP GROUPID 209
GROUP REGIONS 543063056 543063496
# L<level> <function> <filename> <original-function> <line> <variable>
<number> <frequency>
L1 collision mhd.f collision 354 feq 1 0.00862
L1 collision mhd.f collision 355 geq 1 0.00862
GROUP END
```

1.4 Discover the Delinquent Memory Operations by the Compiler

After re-compiling the program with the delinquent memory operation information generated in tool 1.3 (-qx-flag=(CPO2), the compiler builds a global call graph, goes through each call graph node to map the delinquent memory operations into the internal symbol index, and records the delinquent memory operation information. This delinquent memory operation information is used to restructure the code to eliminate the cache misses, to insert data prefetch instructions, to schedule instructions based on the latency, etc.

What is claimed is:

1. A method executed by a processor for dynamically and precisely discovering delinquent memory operations through integration of a compiler, a performance monitoring tool, and an analysis tool comprising:
  compiling an application by the compiler;
  generating executable compiler annotated information by the compiler for utilization by the analysis tool at a delinquent memory operation analysis and for utilization by the compiler during re-compilation, the executable compiler annotated information comprising what inlining optimizations are performed, what unrolling optimizations are performed, information about instruction groups, and what symbol mappings are conducted;
  wherein the application is linked with a tracing library to generate the executable compiler annotated information and executable linker mapping information;
  executing the application to obtain runtime trace information comprising hardware performance counters and tracing library instrumentation events;
  analyzing the trace information, the executable compiler annotated information, and the executable linker mapping information to produce a delinquent memory operation file containing delinquent memory operation information; and
  reading the delinquent memory operation information of the delinquent memory operation file by the compiler to perform memory reference mapping to guide static analysis and memory hierarchy optimization, wherein performing memory reference mapping maps delinquent memory operations externally in a user source code and maps the delinquent memory operation internally in a compiler intermediate representation.

2. The method of claim 1, wherein the delinquent memory operation file containing the delinquent memory operation information comprises a file name, a function name, a line number, a delinquent memory operation name, a memory region identifier, a memory region start address, and a memory region size.

3. A computer program product, tangibly embodied on a non-transitory computer readable medium, for dynamically and precisely discovering delinquent memory operations through integration of a compiler, a performance monitoring tool, and an analysis tool, the computer program product including instructions for causing a computer to execute a method, comprising:

compiling an application;

generating executable compiler annotated information by the compiler for utilization by the analysis tool at a delinquent memory operation analysis and for utilization by the compiler during re-compilation, the executable compiler annotated information comprising what inlining optimizations are performed, what unrolling optimizations are performed, information about instruction groups, and what symbol mappings are conducted;

wherein linking the application is linked with a tracing library to generate the executable compiler annotated information and executable linker mapping information;

executing the application to obtain runtime hardware trace information through hardware performance counts;

analyzing the hardware trace information, the executable compiler annotated information, and the executable linker mapping information to produce a delinquent memory operation file containing delinquent memory operation information; and reading the delinquent memory operation information of the delinquent memory operation file by the compiler to perform memory reference mapping to guide static analysis and memory hierarchy optimizations, wherein performing memory reference mapping maps delinquent memory operations precisely, both externally in a user source code and maps the delinquent memory operations internally in a compiler intermediate representation.

4. The computer program product of claim 3, wherein the delinquent memory operation file containing the delinquent memory operation information comprises a file name, a function name, a line number, a delinquent memory operation name, a memory region identifier, a memory region start address, and a memory region size.

\* \* \* \* \*